(12) United States Patent
Bintz et al.

(10) Patent No.: US 7,161,726 B2
(45) Date of Patent: Jan. 9, 2007

(54) LINEAR OPTICAL MODULATORS AND METHOD OF LINEAR OPTICAL MODULATION

(75) Inventors: Louis J. Bintz, Bothell, WA (US); Raluca Dinu, Redmond, WA (US)

(73) Assignee: Lumera Corporation, Bothell, WA (US)

( * ) Notice: Subject to any disclaimer, the term of this patent is extended or adjusted under 35 U.S.C. 154(b) by 73 days.

(21) Appl. No.: 10/981,920

(22) Filed: Nov. 5, 2004

(65) Prior Publication Data

US 2006/0098910 A1 May 11, 2006

(51) Int. Cl.
*G02F 1/03* (2006.01)
*G02F 1/07* (2006.01)

(52) U.S. Cl. ............ 359/254; 359/259; 359/321; 385/40; 385/132

(58) Field of Classification Search ............ 359/254
See application file for complete search history.

(56) References Cited

U.S. PATENT DOCUMENTS

| | | | |
|---|---|---|---|
| 4,028,702 A | 6/1977 | Levine | |
| 4,258,386 A | 3/1981 | Cheung | |
| 5,041,516 A | 8/1991 | Frechet et al. | |
| 5,051,754 A | 9/1991 | Newberg | |
| 5,198,513 A | 3/1993 | Clement et al. | |
| 5,207,952 A | 5/1993 | Griffin, III | |
| 5,223,356 A | 6/1993 | Kumar et al. | |
| 5,266,365 A | 11/1993 | Kester et al. | |
| 5,353,033 A | 10/1994 | Newberg et al. | |
| 5,359,008 A | 10/1994 | Amano et al. | |
| 5,395,556 A | 3/1995 | Drost et al. | |
| 5,433,895 A | 7/1995 | Jeng et al. | |
| 5,520,968 A | 5/1996 | Wynne et al. | |
| 5,532,867 A * | 7/1996 | Hayes et al. ............ 359/329 |
| 5,635,576 A | 6/1997 | Foll et al. | |
| 5,670,091 A | 9/1997 | Marder et al. | |
| 5,679,763 A | 10/1997 | Jen et al. | |
| 5,696,243 A | 12/1997 | Beckmann et al. | |
| 5,714,304 A | 2/1998 | Gibbons et al. | |
| 5,718,845 A | 2/1998 | Drost et al. | |
| 5,776,374 A | 7/1998 | Newsham et al. | |

(Continued)

FOREIGN PATENT DOCUMENTS

DE 44 01 911 8/1995

(Continued)

OTHER PUBLICATIONS

Bosman et al., "About Dendrimers: Structure, Physical Properties, and Applications," *Chem. Rev.*, 1999, 99:1665-1688.

(Continued)

*Primary Examiner*—Jordan Schwartz
*Assistant Examiner*—Jessica Stultz
(74) *Attorney, Agent, or Firm*—Fish & Richardson P.C.

(57) ABSTRACT

A device that comprises: a) a first optical waveguide; b) a second optical waveguide; c) an optical coupling region including the first and second optical waveguides, the optical coupling region characterized as having at least one coupling length and comprising a first bias section, a modulation section, and a second bias section arranged such that light propagates serially through the first bias section, the modulation section, and the second bias section; d) a first bias electrode for biasing the first bias section; e) a modulating electrode for applying a modulating voltage to the modulation section, the modulating electrode being positioned to control the refractive index of the first optical waveguide; and f) a second bias electrode for biasing the second bias section.

9 Claims, 6 Drawing Sheets

U.S. PATENT DOCUMENTS

| | | | |
|---|---|---|---|
| 5,783,649 | A | 7/1998 | Beckmann et al. |
| 5,811,507 | A | 9/1998 | Chan et al. |
| 5,861,976 | A | 1/1999 | Hoekstra |
| 6,067,186 | A | 5/2000 | Dalton et al. |
| 6,090,332 | A | 7/2000 | Marder et al. |
| 6,126,867 | A | 10/2000 | Kanitz et al. |
| 6,130,339 | A | 10/2000 | Tan et al. |
| 6,175,672 | B1* | 1/2001 | Newberg et al. ............... 385/24 |
| 6,197,921 | B1 | 3/2001 | Tan et al. |
| 6,228,977 | B1 | 5/2001 | Kanitz et al. |
| 6,294,573 | B1 | 9/2001 | Curtin et al. |
| 6,393,190 | B1 | 5/2002 | He et al. |
| 6,403,809 | B1 | 6/2002 | Holmes et al. |
| 6,535,653 | B1* | 3/2003 | Hung et al. ..................... 385/2 |
| 6,647,158 | B1* | 11/2003 | Betts et al. ..................... 385/2 |
| 6,716,995 | B1 | 4/2004 | Huang et al. |
| 6,750,603 | B1 | 6/2004 | Huang et al. |
| 2002/0160282 | A1 | 10/2002 | Huang et al. |
| 2002/0161165 | A1 | 10/2002 | Taylor et al. |
| 2003/0107027 | A1 | 6/2003 | Huang et al. |
| 2003/0147591 | A1* | 8/2003 | Doi et al. ...................... 385/39 |
| 2004/0081389 | A1* | 4/2004 | Soda et al. .................... 385/16 |
| 2004/0096181 | A1 | 5/2004 | Bintz et al. |
| 2004/0114208 | A1* | 6/2004 | Balsamo et al. ............ 359/254 |

FOREIGN PATENT DOCUMENTS

| | | |
|---|---|---|
| DE | 44 16 476 | 11/1995 |
| DE | 195 32 828 | 3/1996 |
| DE | 197 09 185 | 10/1997 |
| EP | 0 414 185 | 2/1991 |
| EP | 0 637 774 | 2/1995 |
| EP | 0 729 056 | 2/1995 |
| EP | 0 754 709 | 1/1997 |
| JP | 8-108624 | 4/1996 |
| JP | 2000-89268 | 3/2000 |
| JP | 2001-85713 | 3/2001 |
| WO | WO 02/14305 | 2/2002 |

OTHER PUBLICATIONS

Bridges and Schaffner, "Distortion in Linearized Electrooptic Modulators," *IEEE Trans. Microwave Theory and Techniques*, 1995, 43(9):2184-2197.

Chen et al., "Thermosetting Polyurethanes with Stable and Large Second-Order Optical Nonlinearity," *Macromolecules*, 1992, 25:4032-4035.

Gorman and Marder, "An investigation of the interrelationships between linear and nonlinear polarizabilities and bond-length alternation in conjugated organic molecules," *Proc. Natl. Acad. Sci. USA*, 1993, 90:11297-11301.

Kim et al., "Nonlinear optical chromophores containing dithienothiophene as a new type of electron relay," *J. Mater. Chem.*, 1999, 9:2227-2232.

Kojima et al., "Facile Synthesis of Thiophene Derivatives Using a Cyclopropenyl Cation," *Synthesis*, 1996, 1193-1195.

Landmesser et al., "Regiocontrolled C-8 Acylation of Castanospermine," *Synthetic Comm.*, 1996, 26(11):2213-2221.

Lin et al., "Scattering Induced Crosstalk in Active Directional Couplers," *J. Lightwave Tech.*, 1996, 14(9):2012-2025.

Liu et al., "Focused Microwave-Assisted Synthesis of 2,5-Dihydrofuran Derivatives as Electron Acceptors for Highly Efficient Nonlinear Optical Chromophores," *Adv. Mater.*, 2003, 15(7-8):603-607.

Luo et al., "Design, Synthesis, and Properties of Highly Efficient Side-Chain Dendronized Nonlinear Optical Polymers for Electro-Optics," *Adv. Mater.*, 2002, 14(23):1763-1768.

Ma et al., "A Convenient Modular Approach of Functionalizing Aromatic Polyquinolines for Electrooptic Devices," *Chem. Mater.*, 1999, 11(8): 2218-2225.

Ma et al., "A Novel Class of High-Performance Perfluorocyclobutane-Containing Polymers for Second-Order Nonlinear Optics," *Chem. Mater.*, 2000, 12:1187-1189.

Ma et al., "Highly Efficient and Thermally Stable Nonlinear Optical Dendrimer for Electrooptics," *J. Am. Chem. Soc.*, 2001, 123:986-987.

Mao et al., "Progress toward Device-Quality Second-Order Nonlinear Optical Materials. 1. Influence of Composition and Processing Conditions on Nonlinearity, Temporal Stability, and Optical Loss," *Chem. Mater.*, 1998, 10:146-155.

March, "Appendix B—Classification on Reactions by Type of Compound Synthesized," *Advanced Organic Chemistry-Reactions, Mechanisms, and Structure*, 1992, 4th Edition, John Wiley & Sons, New York, pp. 1269-1300.

Park et al., "Thermal bias operation in electro-optic polymer modulators," *Appl. Phys. Lett.*, 2003, 83(5):827-829.

Raimundo et al., "Push-pull chromophores based on 2,2'-bi(3,4-ethylenedioxythiophene) (BEDOT) π-conjugating spacer," *Tetrahedron Letters*, 2001, 42:1507-1510.

Reinhardt et al., "Highly Active Two-Photon Dyes: Design, Synthesis, and Characterization toward Application," *Chem. Mater.*, 1998, 10:1863-1874.

Smith, Jr. and Babb, "Perfluorocyclobutane Aromatic Polyethers. Synthesis and Characterization of New Siloxane-Containing Fluoropolymers," *Macromolecules*, 1996, 29(3):852-860.

Umemoto, "Electrophilic Perfluoroalkylating Agents," *Chem Rev.*, 1996, 96:1757-1777.

Yuxia et al., "Synthesis and characterization of a novel nonlinear optical polyurethane polymer," *European Polymer Journal*, 2001, 37:445-449.

* cited by examiner

LINEAR OPTICAL MODULATORS AND METHOD OF LINEAR OPTICAL MODULATION

BACKGROUND OF THE INVENTION

This invention was made with Government support under F30602-03-C-0119 awarded by the AFRL. The Government has certain rights in this invention.

All patents, patent applications, and publications cited within this application are incorporated herein by reference to the same extent as if each individual patent, patent application or publication was specifically and individually incorporated by reference.

The invention relates generally to optical modulators, and more specifically to analog optical modulators. Optical modulators encode radio frequency (RF) onto an optical carrier. When an RF signal is encoded onto an optical carrier, there is a fundamental harmonic RF signal accompanied by higher order RF harmonic signals, all of which are encoded onto the optical carrier. The presence of higher order harmonic signals creates distortion of the fundamental harmonic RF signal, which decreases signal fidelity. High fidelity encoding of the RF signal onto the optical carrier can occur if the transfer function of the modulator is linear. The quantitative measure of optical modulator linearity is the spur-free dynamic range (SFDR). The spur free dynamic range of a modulator is measured at a detector that converts the optical signal into an RF signal. There is always electronic noise from various sources in the detector, and the highest noise level is referred to as the noise floor. The intensity of the current generated at the detector is greatest for the fundamental harmonic of the RF signal. The SFDR is measured as the difference between the intensity of the fundamental harmonic signal and the intensity of the first higher order mode to appear above the intensity of the noise floor. The higher order harmonic is typically the third order harmonic.

Analog optical modulators ideally have a linear transfer function. Analog optical modulators may include optical devices such as, alone or in combination, Mach-Zehnder modulators or directional couplers, for example see W. B. Bridges *IEEE Trans. Microwave Theo. Tech.* 43(9), 2184 (1995). A directional coupler has a coupling region where two optical waveguides are coupled so that light propagating in one optical waveguide can be switched to the other optical waveguide. The distance required for light to switch from one optical waveguide to the other optical waveguide is known as the coupling length. The coupling length may be influenced by a number of factors including the separation between optical waveguides. Light switching within the coupling region may be controlled by changing the refractive index of at least one of the optical waveguides. Typically, the refractive index is changed by applying a voltage across the optical waveguide. The directional couplers can then be used as a modulator if the output of at least one of the waveguides is monitored (i.e., the optical signal in one waveguide disappears when the light is switched to the other waveguide by applying a modulating voltage).

Although many designs for analog optical modulators have been tested and some commercialized, there is still a need for higher linearity as measured by the spur-free dynamic range.

SUMMARY OF THE INVENTION

Figure 1:
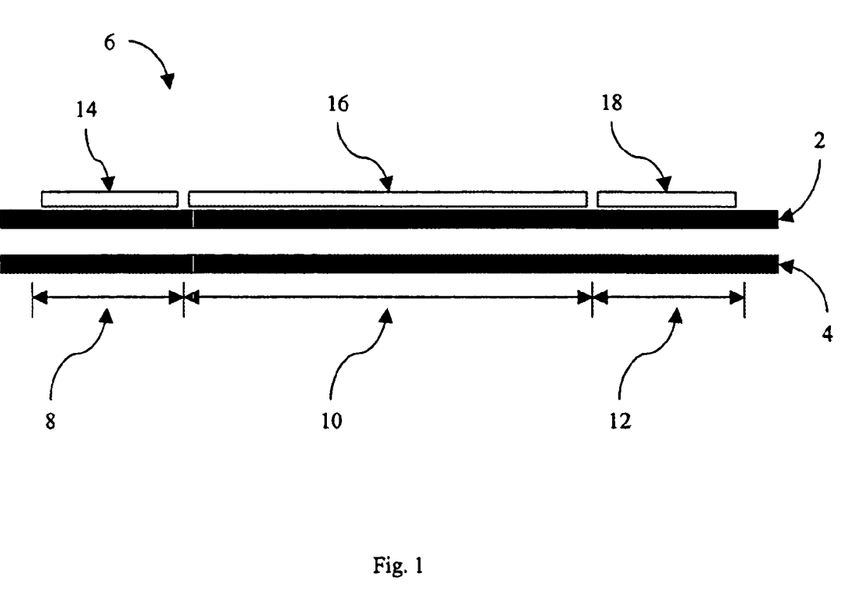
FIG. 1 is a schematic drawing of one embodiment.

One embodiment is a device that comprises, referring to FIG. 1: a) a first optical waveguide (2); b) a second optical waveguide (4); c) an optical coupling region (6) including the first and second optical waveguides, the optical coupling region characterized as having at least one coupling length and comprising a first bias section (8), a modulation section (10), and a second bias section (12) arranged such that light propagates serially through the first bias section, the modulation section, and the second bias section; d) a first bias electrode (14) for biasing the first bias section; e) a modulating electrode (16) for applying a modulating voltage to the modulation section, the modulating electrode being positioned to control the refractive index of the first optical waveguide; and f) a second bias electrode (18) for biasing the second bias section. Calculations show that such a device has a spur-free dynamic range of greater than 110 dB.

Figure 2A:
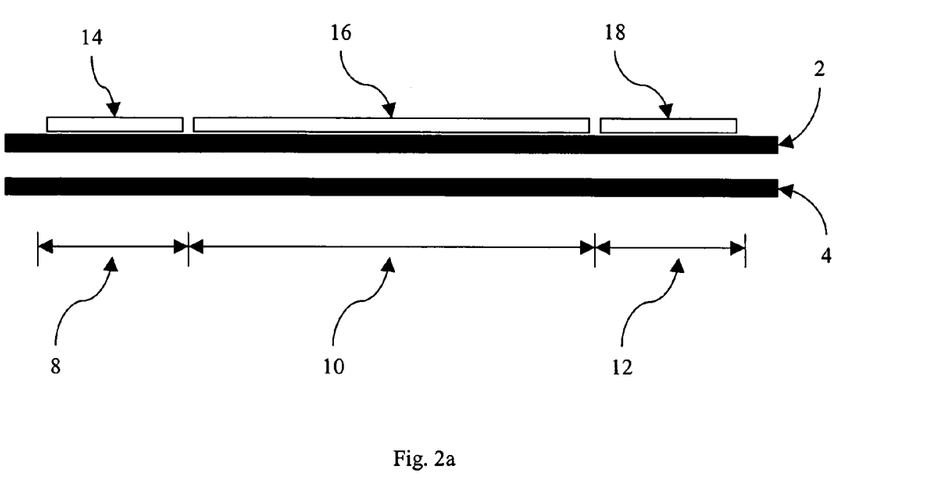
FIGS. 2a–b are schematic drawings of electrode configurations of certain embodiments.
Figure 2B:
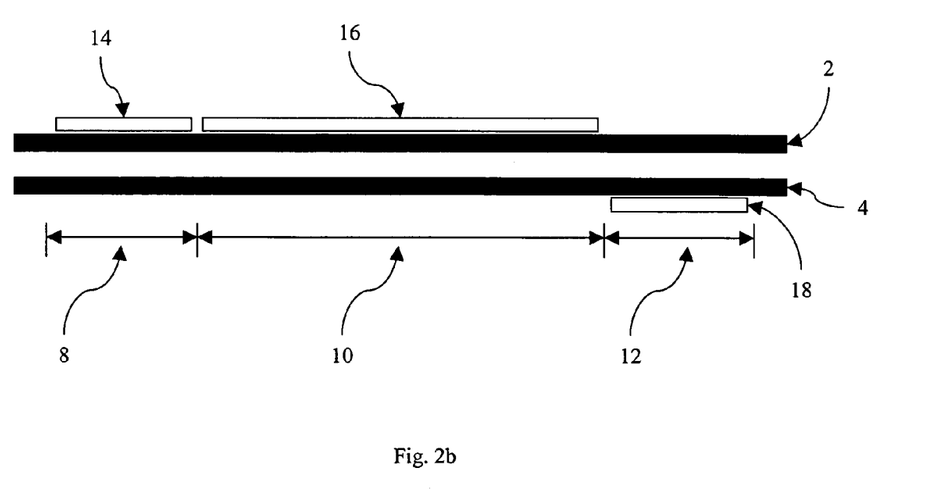
Figure 3A:
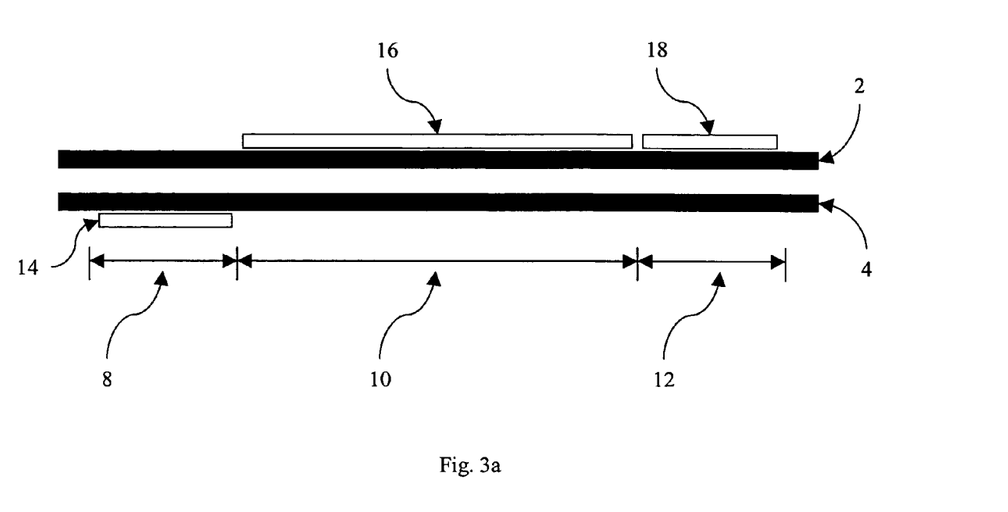
FIGS. 3a–b are schematic drawings of electrode configurations of certain embodiments.
Figure 3B:
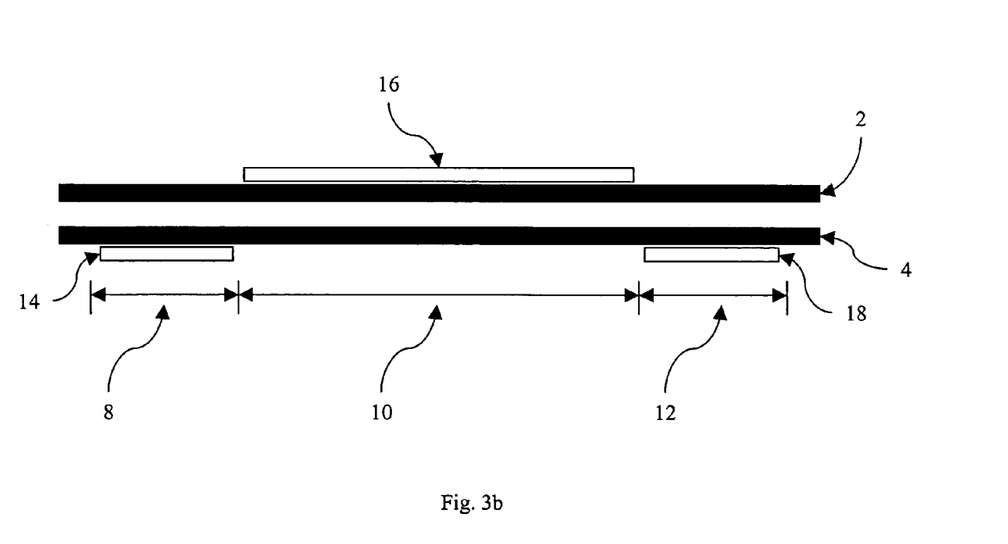

In some embodiments, referring to FIG. 2, the first bias electrode (14) is positioned to control the refractive index in the first optical waveguide and the second bias electrode (18) is positioned to control the refractive index in either the first optical waveguide (FIG. 2a) or the second optical waveguide (FIG. 2b). In other embodiments, referring to FIG. 3, the first bias electrode (14) is positioned to control the refractive index in the second optical waveguide and the second bias electrode (18) is positioned to control the refractive index in either the first optical waveguide (FIG. 3a) or the second optical waveguide (FIG. 3b).

Another embodiment is a method of modulating light comprising: a) propagating light through a device, the device comprising, referring to FIG. 1: i) a first optical waveguide (2); ii) a second optical waveguide (4); iii) an optical coupling region (6) including the first and second optical waveguides, the optical coupling region characterized as having at least one coupling length and comprising a first bias section (8), a modulation section (10), and a second bias section (12) arranged such that the light propagates serially through the first bias section, the modulation section, and the second bias section; iv) a first bias electrode (14) for biasing the first bias section; v) a modulating electrode (16) for applying a modulating voltage to the modulation section, the modulating electrode being positioned to control the refractive index of the first optical waveguide; and vi) a second bias electrode (18) for biasing the second bias section; b) applying a first bias to the first bias section; c) applying a modulating voltage across the modulation section; and d) applying a second bias to the second bias section. The first bias and the second bias may be independently a DC bias or a thermal bias.

Other features and advantages of the invention will be apparent from the following description of preferred embodiments thereof, from the figures, and from the claims.

DETAILED DESCRIPTION

One embodiment is a device that comprises, referring to FIG. 1: a) a first optical waveguide (2); b) a second optical waveguide (4); c) an optical coupling region (6) including the first and second optical waveguides, the optical coupling region characterized as having at least one coupling length and comprising a first bias section (8), a modulation section (10), and a second bias section (12) arranged such that light propagates serially through the first bias section, the modulation section, and the second bias section; d) a first bias electrode (14) for biasing the first bias section; e) a modulating electrode (16) for applying a modulating voltage to the modulation section, the modulating electrode being positioned to control the refractive index of the first optical waveguide; and f) a second bias electrode (18) for biasing the second bias section. Typically, the optical coupling length is described when the device is in passive mode (i.e., no electrical fields are applied to any of the electrodes). When an electrode is referred to in the singular, it is to be understood that the electrode may consist of a ground plane electrode and a hot electrode. Preferably, the length of the first bias electrode and the second bias electrode is independently from 0.25–0.75 times the coupling length, and the length of the modulating electrode is 0.5–1.25 times the coupling length. The first bias electrode and the second bias electrode may be independently a lumped electrode or a thermo-optic electrode. When a bias electrode is a lumped electrode the device is said to be DC biased, and when a bias electrode is a thermo-optic electrode (e.g., a heater strip) the device is said to be thermally biased. Examples of thermally biased devices can be found, for example, in Park, et al. *Appl. Phys. Lett.* 2003, 83(5), 827–829.

Figure 4:
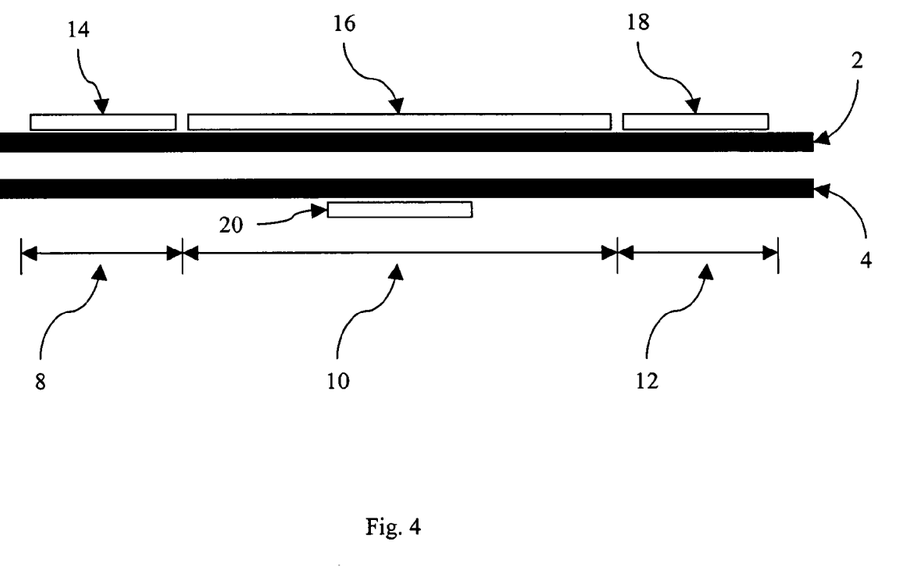
FIG. 4 is a schematic drawing of a preferred embodiment.

In some embodiments, referring to FIG. 2, the first bias electrode (14) is positioned to control the refractive index in the first optical waveguide and the second bias electrode (18) is positioned to control the refractive index in either the first optical waveguide (FIG. 2a) or the second optical waveguide (FIG. 2b). In other embodiments, referring to FIG. 3, the first bias electrode (14) is positioned to control the refractive index in the second optical waveguide and the second bias electrode (18) is positioned to control the refractive index in either the first optical waveguide (FIG. 3a) or the second optical waveguide (FIG. 3b). In yet another embodiment, referring to FIG. 4, the device further comprises a third bias electrode (20) to control the refractive index of the second optical waveguide in the modulation section. The third bias electrode may be a lumped electrode or a thermo-optic electrode. Preferably, the device has a spur free dynamic range of greater than 110 dB.

In many embodiments, the first optical waveguide and the second optical waveguide are parallel to each other and are separated by 12–16 μm in the coupling region. Preferably, the first optical waveguide and the second optical waveguide independently have waveguide widths of 2.5–3.5 μm.

In some embodiments, the optical coupling region includes 1–3 coupling lengths. Preferably, the optical coupling region is 1–3 cm.

Figure 5:
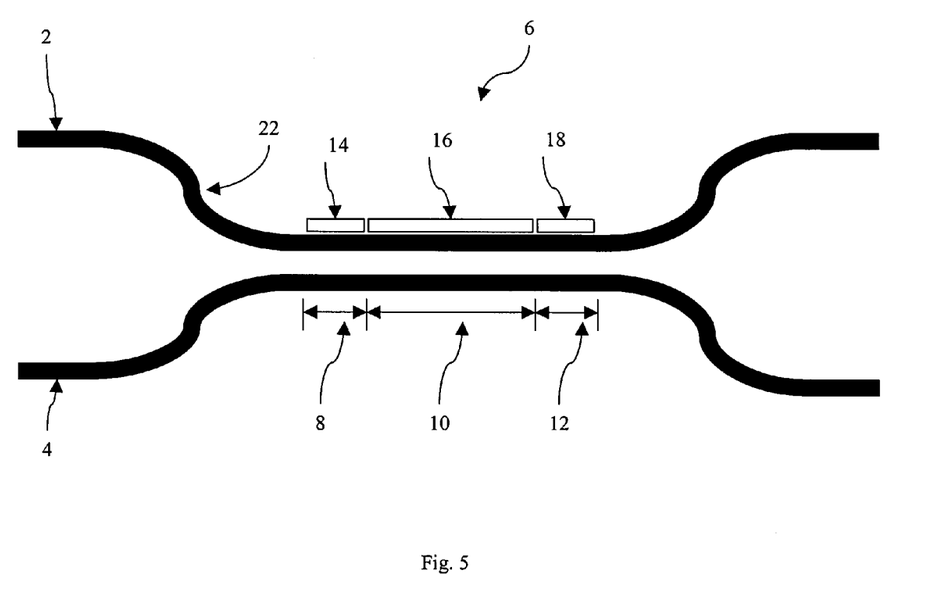
FIG. 5 is a schematic drawing showing s-bend parts of the optical waveguides.

In preferred embodiments, the first optical waveguide and the second optical waveguide comprise polymers. When the first optical waveguide and the second optical waveguide comprise polymers, preferably each of the first and second optical waveguides comprises a bottom clad, an electro-optic polymer core, and a top clad. When the first and second optical waveguides are polymeric, the electro-optic polymer core is preferably in the form of a quasi-rib, a quasi-trench, a rib, or a trench. What is meant by a quasi-rib, a quasi-trench, a rib, or a trench can be found, for example, in US Pat. Appl. Pub. 2004/0096181. The bottom clad and the top clad may independently comprise a crosslinked polymer. Preferably, the bottom clad comprises a polymer and has a thickness of 2.5–3.5 μm, the electro-optic polymer core has a thickness of 2–3 μm, and the top clad comprises and polymer and has a thickness of 2.5–2.5 μm. In one particular embodiment, the electro-optic polymer core is in the form of a trench having a trench depth of from 0.3–0.9 μm and a waveguide width of 2.5–3.5 μm. When the electro-optic polymer core is in the form of a trench having a trench depth of from 0.3–0.9 μm and a waveguide width of 2.5–3.5 μm, preferably the length of the first bias electrode and the second bias electrode is independently from 0.25–0.75 times the coupling length and the length of the modulating electrode is 0.5–1.25 times the coupling length. Referring to FIG. 5, the first optical waveguide and the second optical waveguide each may also further comprise at least one s-bend (22). Typically, the s-bend portion of the waveguide is located outside the coupling region. When the optical waveguides comprise polymers, the first bias electrode, the second bias electrode, separation between waveguides, the waveguide widths, coupling lengths, and the length of the optical coupling region are all as described above.

Another embodiment is a method of modulating light comprising: a) propagating light through a device, the device comprising, referring to FIG. 1: i) a first optical waveguide (2); ii) a second optical waveguide (4); iii) an optical coupling region (6) including the first and second optical waveguides, the optical coupling region characterized as having at least one coupling length and comprising a first bias section (8), a modulation section (10), and a second bias section (12) arranged such that the light propagates serially through the first bias section, the modulation section, and the second bias section; iv) a first bias electrode (14) for biasing the first bias section; v) a modulating electrode (16) for applying a modulating voltage to the modulation section, the modulating electrode being positioned to control the refractive index of the first optical waveguide; and vi) a second bias electrode (18) for biasing the second bias section; b) applying a first bias to the first bias section; c) applying a modulating voltage across the modulation section; and d) applying a second bias to the second bias section. The first bias and the second bias may be independently a DC bias or a thermal bias. The optical coupling region may include 1–3 coupling lengths. The first bias electrode, the second bias electrode, separation between waveguides, the waveguide widths, coupling lengths, and the length of the optical coupling region may all be as described above. The waveguides may also be polymeric, with the bottom clad, electro-optic core, and top clad being as described above.

EXAMPLES

The following example(s) is illustrative and does not limit the Claims.

The following is a brief description of the method used to calculate spur-free dynamic range.

The optical modes that result from coupling electrical power (RF and DC) into the optical waveguides are calculated using methods such as that reported in Lin, et al. *J. Lightwave Tech.* 14(9), 2012 (1996). The optical modes for each section of the device are calculated separately. The output of first bias section is used as the input for the modulation section. The output of the modulation section is used as the input for the second bias section. The output of the second bias section is used as the input of the detector. The input of the detector is used to calculate SFDR. We assume that all noise, including the signal dependent shot noise, is additive. With this proviso, we can obtain a simple expression relating the microwave (RF) power out of the receiver $P_{out}$ with the microwave power, $P_{in}$, incident on the detector. The voltage $V_m$ is developed across the modulator load impedance $R_m$, which we have assumed to be real (or at least predominantly real). This voltage is expressible in terms of the (time averaged quantity) $P_{in}$ by $$V_m = \sqrt{2 R_m P_{in}} x(t)$$

where the x(t) is the dimensionless signal which had been squared by a low noise amplifier (LNA) in order to obtain the $P_{in}$ from the voltage at the terminals of an RF signal generator (e.g., and antenna), but which we are now assuming has been recovered in its initial positive and negative going form by the electrodes of the modulator. We will tacitly assume that the x(t) in what follows is a sinusoid or a sum of sinusoids, always with a zero mean value. It should be noted that the positive and negative going nature of the recovered x(t) requires that the LNA is linear, the transmission from LNA to modulator is distortion free and that the modulator represents a balanced (even if not fully matched) load to the LNA such that the square root really returns the initial signal generator voltage signal with no rectification. The modulator is defined by a transfer function $T(V/V_s)$, where the basic definition of a transfer function is $$0 \leq T(V/V_a) \leq 1)$$

such that the optical power out of the modulator is given by $$P_{opt} = P_{bias} T(V_m/V_a)$$

where the $P_{bias}$ is the optical power supplied to the output of the modulator when the modulator is in its fully transmitting state. A portion of this $P_{opt}$ will be converted by the detector into a current $i_d$. This conversion is normally expressed in terms of a responsivity R and an optical link loss L by $$i_d = R\{P_{opt} 10^{-L}\}.$$

It should be noted that the $P_{opt}$ will generally be riding on a DC signal (for any operating point other than that where the modulator is biased around a zero of the transfer function, which would be a maximally nonlinear operating point). We assume that this DC optical power is the term that will give rise to the noise floor in the receiver through the shot noise current that it will generate in the receiver. With all of the above, the microwave power exiting the optical link (i.e., optical modulator) is, therefore, expressible in terms of the detector current and load resistance RL of the receiver as $$P_{out} = i_d^2 R_L.$$

Putting together most of the above in a single equation, we write that $$P_{out} = R^2 P_{bias}^2 10^{-2L} T^2(V_m/V_s) R_L$$

where the $P_{in}$ is now buried in the $V_m$.

We assume that $T(V/V_s)$ can be expanded as a power series such that $$T(V/V_s) = \sum_m T_m \left(\frac{V}{V_s}\right)^m.$$

To keep the values of the transfer function between zero and unity, we can further express it in terms of the Stokes parameters S. If we use the Stokes parameters referenced to the Poincare sphere (not to the Bloch sphere), we could write that $$T(V_m/V_s) = 1 - S_2(V_m/V_s).$$

The usual test for linearity of an optical link is whether a signal of the form $$x(t) = \sin w_1 t + \sin w_2 t$$

can be retrieved at the output of the receiver. One can formulate the problem also as one in terms of the Fourier series expansion of $$T(V_m/V_s) = 1 - S_2(V_m/V_s)$$

when the $V_m$ is given as a pure sinusoid.

There will be an input power level at which the Fourier series of $$T^2(V_m/V_s)$$

exhibits only a DC level and the fundamental harmonic above the noise floor of the receiver. At a higher input power, a second harmonic, oftentimes the third order harmonic, also rises above the noise floor. At this higher input power, the output due to the first order harmonic alone will have some value. SFDR is the difference between the output due to the first harmonic and the output due to the third harmonic at the point where it rises above the noise level (i.e., the noise floor itself). To attempt to make this more explicit, we can write that $$F\{P_{out}\} = R^2 P_{bias}^2 10^{-2L} F\{(1 - S_2(mt;epmrl;\sqrt{2}italR\text{-}medinfbeginitalmenditalre\text{-}setitalPmedinfbeginitalinenditalresetrlxmx} \sin 2\pi t/V_s))^2\} R_L$$

where the excitation has been taken at a frequency of 1 Hz. Generally what we desire is a logarithmic relation between the power from the antenna $P_{in}$ and the power out of the receiver $P_{out}$. Clearly, we can take the logarithm $$10 \log [F\{P_{out}\}] = 10 \log [R^2 P_{bias}^2 10^{-2L} F\{(1 - S_2(mt; epmrl;\sqrt{2}italRmedinfbeginitalmendital\text{-}resetitalPmedinfbeginitalinenditalresetrlxmx} \sin 2\pi t/V_s))^2\} R_L]$$

and for each frequency use this above equation to calculate the SFDR by taking the difference of the intensity of the fundamental harmonic and the intensity of the first higher order harmonic that appears above the noise floor.

The following example is of a device having polymer trench waveguides.

Figure 6:
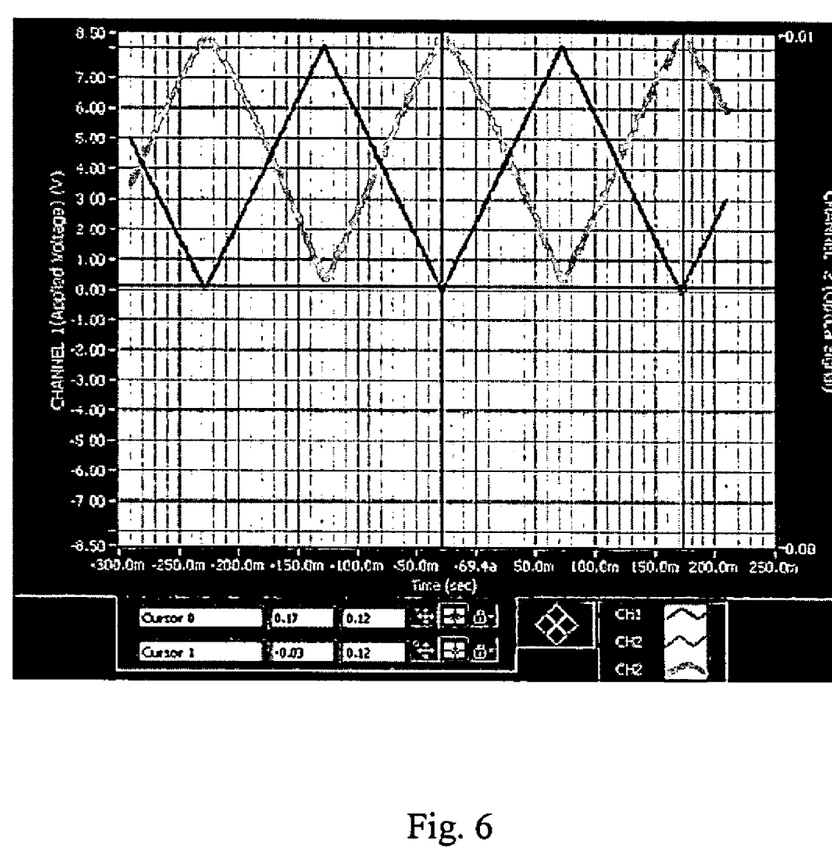
FIG. 6 illustrates an embodiment and the optical test demonstrating linearity.

For the ground plane of the bias and modulating electrodes, an adhesion layer of 20 nm thick chromium was sputtered on a 6-inch silicon wafer. Next, a 500 nm thick layer of gold was sputtered on top of the chromium. An image of the ground plane was photolithographically patterned and the gold was wet etched with Transene Gold Etch—Type TFA followed by wet etching of the chromium with Cyantek CR-7 Chromium Etchant. A commercial polymer, UV-15 LV from Masterbond, was spin deposited on top of the gold and cured (crosslinked) under UV irradiation followed by heating to form the bottom clad with a thickness of 3.0 μm. The images of the waveguides were photolithographically patterned and the trenches were dry etched in the bottom clad using oxygen. The trench (i.e., waveguide) depths were ~0.8 μm, the trench widths were 3.5 μm, and the distance between trenches in the coupling region was 12 μm. An electro-optic polymer, such as those described in U.S. Pat. No. 6,750,603 in cyclopentanone was spin deposited on the bottom clad to form the EO polymer core. The thickness of the EO polymer layer above the trench was 2.9 μm. The commercial solution of UV-15 LV was diluted with methanol and spin deposited on top of the polymer core and UV cured to form a thin "barrier" layer to prevent partial dissolution of the EO polymer core during spin deposition of the UV-15 LV top clad. The UV-15 LV was spin deposited on top of the EO polymer/barrier layer and cured to form a 2.8 μm thick top clad. An adhesion layer of chromium was sputtered on top of the UV-15 LV top clad followed by a 100 nm thick layer of gold. An image of the poling electrode was photolithographically patterned and the gold and chromium were wet etched as described above. Contacts were made with the ground plane and poling electrode. The wafer was heated to about 140° C. (the $T_g$ of the EO polymer), and 325 V was applied for about 5 min. After cooling to room temperature, the gold and chromium of the poling electrode were wet etched away. An adhesion layer of chromium was sputtered on top of the UV-15 LV top clad followed by a 100 nm thick of gold layer. The gold and chromium were photolithographically/wet etched patterned as described above and then the gold was electroplated to a thickness of about 4.2 μm to form a 0.75 cm first bias electrode (lumped) over the first optical waveguide, a 1.125 cm modulating electrode (microwave stripline), and a 0.75 cm second bias electrode (lumped) over the first optical waveguide. The transfer function (RF to optical) is shown in FIG. 6 demonstrating the modulator linearity.

Other embodiments are within the following claims.

The invention claimed is:

1. A device, comprising:
   a. a first polymer optical waveguide comprising a bottom crosslinked polymer clad, an electro-optic polymer core, and a top crosslinked polymer clad, wherein the bottom crosslinked polymer clad has a thickness of 2.5–3.5 micrometers, the electro-optic polymer core has a thickness of 2–3 micrometers, and the top crosslinked polymer clad has a thickness of 2.5–3.5 micrometers;
   b. a second polymer optical waveguide comprising a bottom crosslinked polymer clad, an electro-optic polymer core, and a top crosslinked polymer clad, wherein the bottom crosslinked polymer clad has a thickness of 2.5–3.5 micrometers, the electro-optic polymer core has a thickness of 2–3 micrometers, and the top crosslinked polymer clad has a thickness of 2.5–3.5 micrometers;
   c. an optical coupling region including the first and second optical waveguides, the optical coupling region characterized as having at least one coupling length and comprising a first bias section, a modulation section, and a second bias section arranged such that light propagates serially through the first bias section, the modulation section, and the second bias section;
   d. a first bias electrode for biasing the first bias section;
   e. a modulating electrode for applying a modulating voltage to the modulation section, the modulating electrode being positioned to control the refractive index of the first optical waveguide; and
   f. a second bias electrode for biasing the second bias section.

2. The device of claim 1, wherein the electro-optic polymer core is in the form of a trench having a trench depth of from 0.3–0.9 micrometers and a waveguide width of 2.5–3.5 micrometers.

3. The device of claim 2, wherein the length of the first bias electrode and the second bias electrode is independently from 0.25–0.75 times the coupling length and the length of the modulating electrode is 0.5–1.25 times the coupling length.

4. The device of claim 3, wherein the first optical waveguide and the second optical waveguide each comprise an s-bend.

5. A method modulating light, comprising:
   a. propagating light through the device of claim 1;
   b. applying a first bias to the first bias section;
   c. applying a modulating voltage across the modulation section; and
   d. applying a second bias to the second bias section.

6. The method of claim 5, wherein the first bias and the second bias are independently a DC bias or a thermal bias.

7. The method of claim 5, wherein the optical coupling region includes 1–3 different possible coupling lengths.

8. The method of claim 5, wherein the length of the optical coupling region is 1–3 cm.

9. A method modulating light, comprising:
   a. propagating light through the device of claim 3;
   b. applying a first bias to the first bias section;
   c. applying a modulating voltage across the modulation section; and
   d. applying a second bias to the second bias section.

* * * * *

UNITED STATES PATENT AND TRADEMARK OFFICE
CERTIFICATE OF CORRECTION

| | | |
|---|---|---|
| PATENT NO. | : 7,161,726 B2 | Page 1 of 1 |
| APPLICATION NO. | : 10/981920 | |
| DATED | : January 9, 2007 | |
| INVENTOR(S) | : Louis J. Bintz and Raluca Dinu | |

It is certified that error appears in the above-identified patent and that said Letters Patent is hereby corrected as shown below:

Title Page (Page 2), References Cited, Other Publications, March reference, please delete "on" and insert --of--therefor;

Column 8, line 25 (Claim 3), please delete "0.25 0.75", and insert --0.25-0.75--therefor.

Signed and Sealed this

Twenty-fourth Day of April, 2007

JON W. DUDAS
*Director of the United States Patent and Trademark Office*